United States Patent Office 3,217,536
Patented Nov. 16, 1965

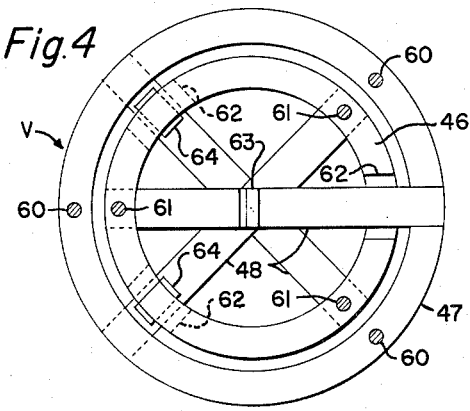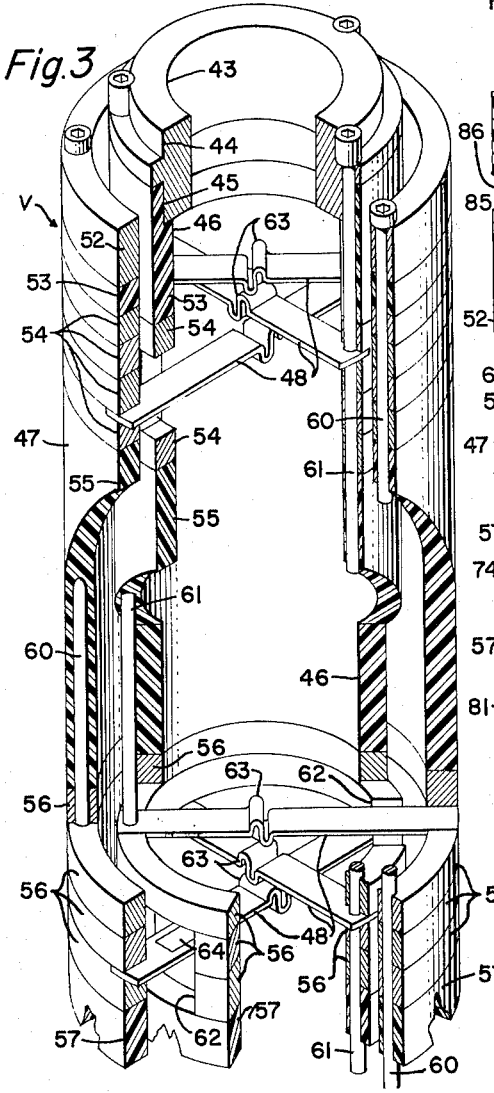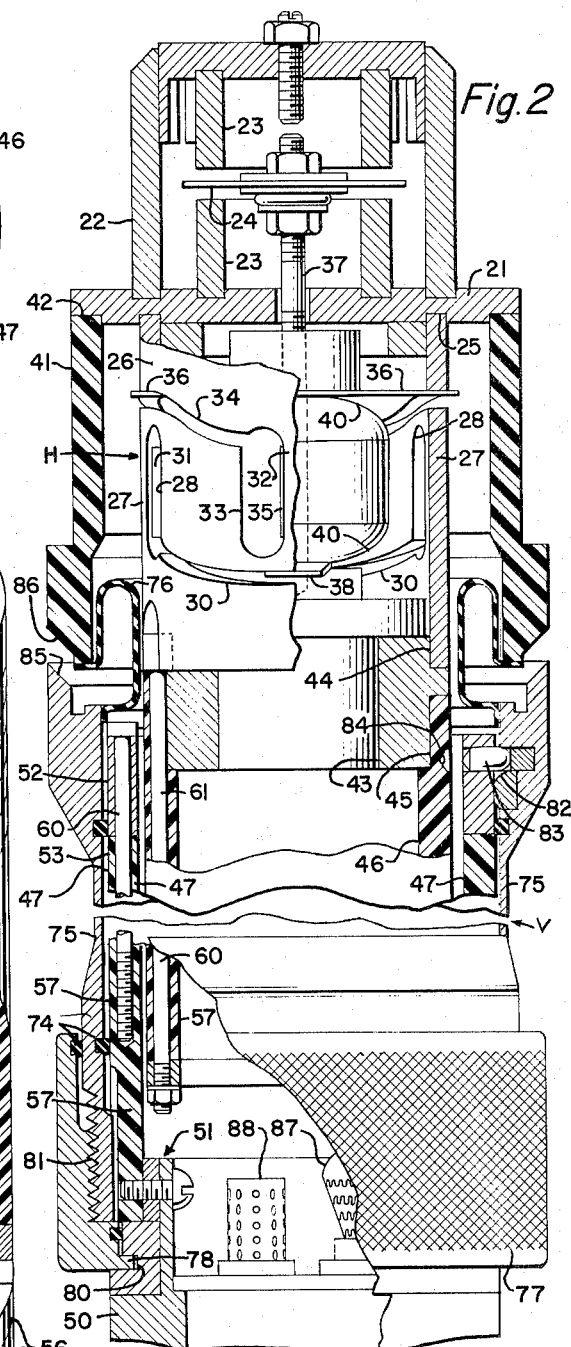

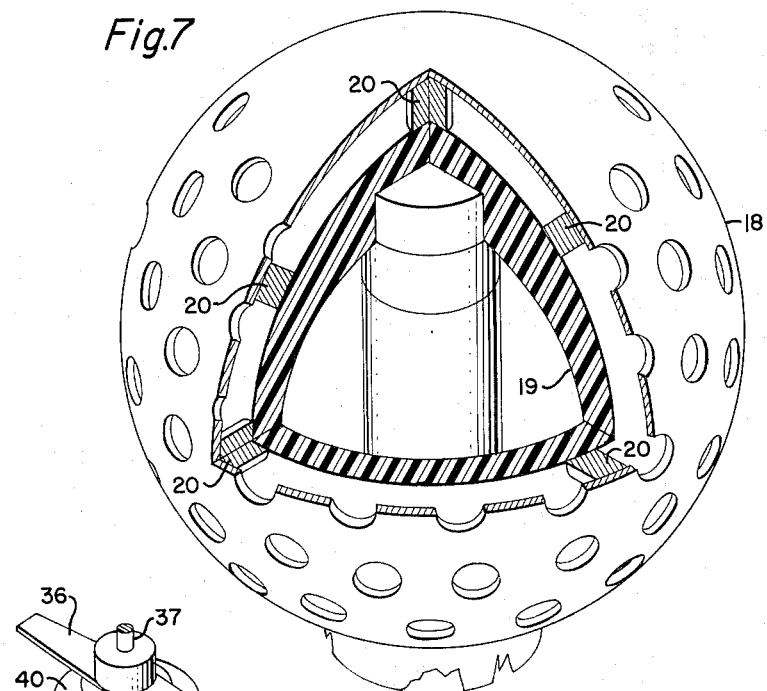
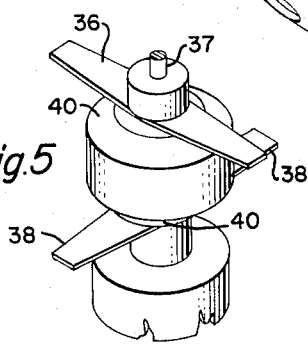
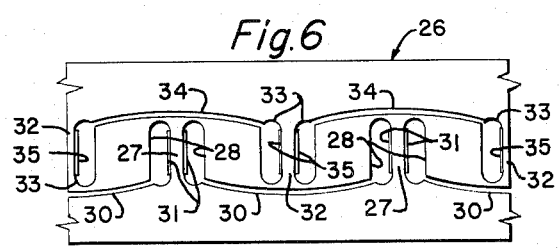
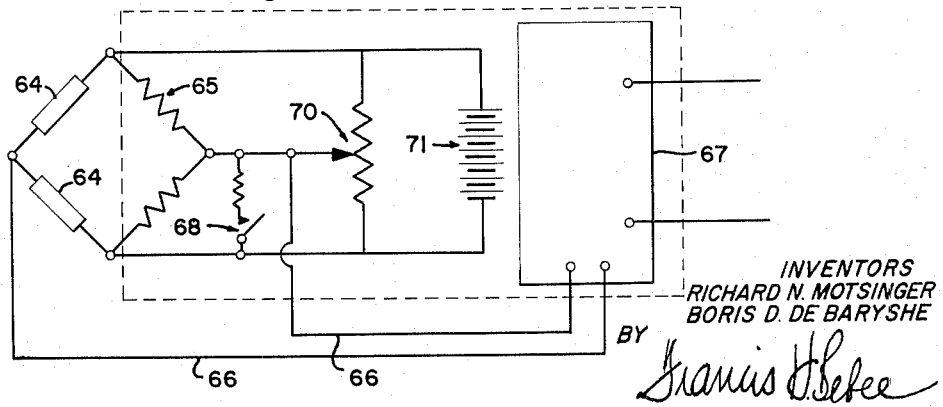

3,217,536
FORCE VECTOR TRANSDUCER
Richard N. Motsinger, Phoenix, and Boris D. De Baryshe, Scottsdale, Ariz., assignors to The Garrett Corporation, Los Angeles, Calif., a corporation of California
Filed Feb. 16, 1961, Ser. No. 89,821
22 Claims. (Cl. 73—189)

This invention relates to force vector transducers, and more particularly to a force vector transducer that is especially adapted for measuring both the direction and the extent of the three force components of a moving current of fluid such as air or water.

In the study and recording of wind currents at the present time, at least two instruments are now normally used for measuring the velocity and directional components of a current of air. The anemometer is still the device in most prominent use for determining the velocity of the wind, and the usual weather or wind vane provides the means for indicating the prevalent direction of a wind current. With the introduction of and increasing interest in micrometeorology, anemometers and wind vanes have become progressively lighter in weight and their delicate mechanisms more expensive. While many special field studies have been accomplished with such lightweight laboratory type of equipment, the considerations necessary for their improved response are contrary to those needed for general purpose application. Moreover, the growing use of wind data in diverse fields of meteorology has shown the need for an instrument technique and design that overcomes the many limitations of conventional anemometers and wind vanes.

Recently attempts have been made to provide a single instrument for measuring both wind velocity and direction. These attempts involve the use of a sphere or globe which is resiliently suspended on a plurality of springs or tension devices. Means are provided for measuring the spring deflection or changes in tension caused by movement of the sphere when a wind current strikes it. None of these proposals has been used successfully, however, largely because there has been no way of preventing the spring system from oscillating, with the result that it has been impossible to obtain an accurate measurement. Furthermore, no provision has been made in such proposals for the static and dynamic balance of the instrument, so that such prior instruments have been position-sensitive and inaccuracies result from any changes in the position and angular disposition thereof.

Accordingly, it is an object of this invention to provide an improved force vector transducer which is capable of superior performance in severe environmental conditions, and, when used to measure wind currents, overcomes the many limitations of prior devices including conventional anemometers and wind vanes.

Another object of this invention is to provide a force vector transducer which is adapted for measuring wind currents and permits the accurate determination of three dimensional force vectors and the prevalent current direction in a single instrument.

Another object of this invention is to provide a force vector transducer which is free of moving parts, and is based on principles that are applicable to a wide variety of uses and conditions, and is both statically and dynamically balanced.

A further object of this invention is to provide a force vector transducer which is balanced statically and dynamically and includes a plurality of flexure sections having strain gages associated therewith for the purpose of measuring force vectors in three dimensions.

Another object of this invention is to provide a balanced force vector transducer particularly adaptable for measuring forces applied thereto, and including a force sensing structure which will detect and resolve a force applied thereto into two horizontal and one vertical force vectors, and means for damping all vibration of said sensing structure.

Still another object of this invention is to provide a balanced force vector transducer for measuring fluid currents, comprising a force sensing structure suitably mounted on a column containing a plurality of semiconductor strain gages which are arranged in said column to be acted upon by two horizontal force components, and also containing means for causing said column to respond in a nonlinear manner to such force components.

It is a further object of this invention to provide a balanced force vector transducer for measuring fluid currents, comprising a force sensing structure for detecting and resolving a fluid current into a plurality of measurable force vectors, and means for accurately measuring said force vectors.

A still further object of this invention is to provide a force vector transducer for measuring fluid currents, comprising a force sensing structure for detecting and resolving a fluid current into a plurality of measurable force vectors, means for supporting said force sensing structure, means carried by said supporting means for measuring such plurality of force vectors, and means for statically and dynamically balancing the entire transducer.

Another object of this invention is to provide a force vector transducer particularly adapted for measuring wind currents, and comprising a partially spherical aerodynamic structure which is constructed to produce a maximum drag coefficient, a mast for supporting said structure, means carried by said mast for measuring said force vectors, means for damping any vibrations in said mast and said structure, and means for dynamically and statically balancing the combined mast and aerodynamic structure.

The above and other objects and advantages of the invention will be apparent from the following description and the accompanying drawings, in which:

FIG. 2 is a sectional veiw of portions of the apparatus shown in FIG. 1;

FIG. 3 is a perspective view of the vertical flexure unit with portions omitted, broken away, and in section;

FIG. 4 is a horizontal plan view of the vertical flexure unit shown in FIG. 3;

FIG. 5 is a perspective view of one form of limiting device for the horizontal flexure unit shown in FIG. 2;

FIG. 6 is a developed view of the horizontal flexure unit;

FIG. 7 is a perspective view, with portions broken away and in section, of a modified form of force vector transducer; and FIG. 8 is a schematic wiring diagram illustrating one form of electric circuit that may be used with the force vector transducer.

Figure 1:
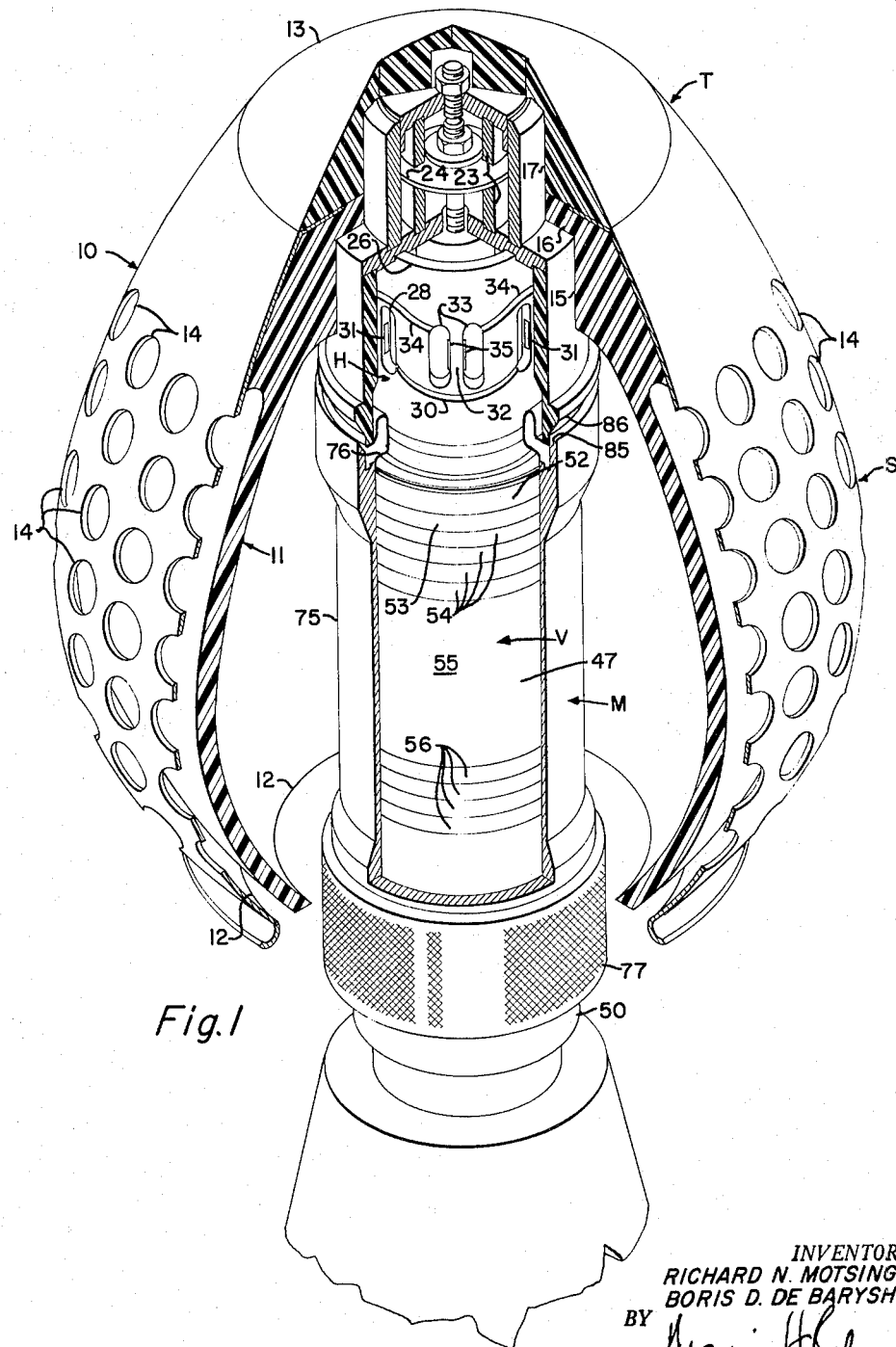
FIG. 1 is a perspective view, with portions broken away and in section, of a force vector transducer embodying the principles of this invention.

According to the present invention, an improved force vector transducer is provided which is adaptable for accurately measuring the direction and extent of the force vectors included in a current, stream, or other movement of any fluid medium such as air or water; or the forces to be measured may be created by the movement of the transducer in or through a fluid medium such as air or other gas or water. In the following discussion and description, however, the features of the invention have been applied particularly to an instrument designed especially for measuring the velocity and direction of wind currents.

Referring now to FIG. 1 of the drawings, a force vector transducer T, designed particularly for making wind measurements, is shown as comprising an aerodynamic force sensing structure S mounted on a mast M. These basic components of the instrument are arranged so that air movement in the form of wind currents striking the force sensing structure S is resolved into measurable force vectors which exert their effect on the mast M as bending moments. Such force exertion is transmitted through the mast structure to a first flexure unit H, which is adapted to measure the horizontal components, and a second flexure unit V for measuring the vertical component. As shown, the horizontal and vertical flexure units are part of the mast structure. All of these basic elements of the instrument will now be described in detail.

Sensing structure S, in this instance, is the aerodynamic structure and comprises an outer shell 10 and an inner shell 11 spaced therefrom throughout most of its area but connected thereto at the upper portion. In the form shown in FIG. 1, the shells 10 and 11 are in the shape of prolate spheroids which include openings 12 at the lower wider portions and an upper cap or closure 13. Mast M extends through the openings 12 to the top of the structure adjacent cap 13. The internal dimensions of the structure are such that ample room is provided for housing the flexure units H and V; and the shell 11 thus provides an outer protective cover for the delicate portions of the instrument. The outer body or surface of the sensing structure S is acted upon by the force of the wind, and, due to the shape and configuration of the structure, is affected by what is called "aerodynamic drag." In the mechanism of drag, the total dynamic pressure of the moving air is reduced by turbulent flow around the structure S; and there is a resulting momentum loss which is evidenced in a primary force vector that tends to move the sensing structure in rotation about the horizontal flexure unit H.

It is important that, for all magnitudes of wind velocity, the air flow around the aerodynamic sensing structure S be turbulent flow rather than laminar flow. When the outer surface of the shell 10 is completely smooth, there is a particular velocity range of the wind striking such surface at which the flow characteristics change from laminar to turbulent. At this point, which is called the "Critical Reynolds Number," the drag coefficient of the body goes through an inflection; however, any such severe change in drag characteristics is most unsuitable. It has been found that this can be prevented by constructing the outer shell 10 with a multiplicity of small openings or apertures 14. These may be circular in shape and provide a means for inducing turbulent flow about the structure S regardless of flow velocity. At the same time, this construction creates the largest or maximum drag coefficient, and thus makes it possible to minimize the overall size of the aerodynamic structure.

By providing a pervious outer surface in the shell 10, such as by the provision of the openings 14, as described above, each segment of area on the surface of the outer shell acts as a small flat plate. In aerodynamics such a plate has a nearly theoretical maximum drag coefficient, and this coefficient is substantially constant for subsonic flow. The outer surface of the inner shell 11 is solid, as contrasted with the apertured outer shell 10, and the turbulent air passing through the apertures 14 creates further drag in passing around said inner shell.

Lightweight construction is important in connection with the response of the instrument. It has been found that from the standpoint of both weight and ease of construction certain foamed plastics, such as foamed styrene or polyurethane, are suitable materials for the inner shell 11. The outer shell 10 is preferably somewhat more rigid than foam plastic and may be made of a lightweight, relatively thin-gage metal such as aluminum sheet, or it may be constructed of a thermosetting plastic such as polyester or epoxy resin laminated with Fiberglas or other suitable synthetic fibers to give the desired strength. It is desirable to have the outer shell 10 thin so that the edges of the metal around the holes 14 will be sharp and thus help to promote the desired turbulence. Finally, the surface that is exposed to the weather may be coated with fluorocarbon resins (Teflon), polyethylene, or any other suitable coating material which will render the surface substantially impervious to weathering and repellent to the accumulation of dirt, water droplets, snow, and sleet. It will be apparent that any airborne solids will either be blown on through the structure or settle out through the bottom opening 12 around the mast M, and this is an important feature of the instrument.

As shown in FIG. 1, the upper end of the inner shell is formed with a cylindrical opening 15 which is of suitable size and shape for the reception of at least part of the upper portion of the horizontal flexure section H. A relatively snug fit is desirable, and an annular supporting shoulder or rim 16 may be provided at the upper edge of the opening 15 to further stabilize the contact between the upper end of the mast M and the aerodynamic sensing structure S. It will be understood that the contact between the inner shell and the flexure section H of the mast provides the connection between these elements for transmitting the forces from the sensing structure S to the mast. A cylindrical cavity 17 is provided in the underside of the cap 13 to house the very top of the mast. This form of construction renders the sensing structure easily removable from the mast as a unit so that aerodynamic structures of different sizes may be used or interchanged to allow major scale changes in the velocity range of the instrument. Thus, if hurricane conditions are to be encountered, a small structure will reduce the mast loads as well as the forces transmitted to the flexure units H and V. Similarly, for micrometeorology, a large aerodynamic structure S will provide the most effective resolution of forces involved in wind movement below ten miles per hour, yet may be made sturdy enough to withstand rather violent changes in weather conditions.

It has been found that the optimum shape for the sensing structure S is a prolate spheroid, i.e., a sphere which is elongated along its polar axis. The reasons for this preference are: (1) It produces aerodynamic flow conditions somewhere between the two dimensional flow conditions of a cylinder and the three dimensional conditions of a sphere; (2) The elongated space inside affords room for the vertical flexure unit V; and (3) At the same time, a greater moment arm is provided for the horizontal components to work through. There are situations, however, where a spherical form of sensing structure S may be desirable. Such a construction is shown in FIG. 7 where the sensing structure comprises an outer spherical shell 18 and an inner shell 19 spaced therefrom by means of supports 20. As with the shells 10 and 11, the outer thin shell 18 may be constructed of lightweight metal, laminated plastic, or a regular plastic such as polyethylene. It is provided with a multiplicity of holes or apertures similar to the holes 14. The inner shell 19 may be molded or otherwise formed of suitable foamed plastic. This spherically shaped sensing structure may also be mounted on or attached to a mast containing suitable flexure sections for measuring the forces sensed thereby.

The center of pressure of the wind force against the shell assembly of the aerodynamic structure is displaced from the plane of the horizontal flexure unit H by a distance which is actually a moment arm. (The "center of pressure" is that point on the surface or within an aerodynamic shape where the resultant force or sum of all the fluid forces acts.) In the case of the spherical sensing unit of FIG. 7, the moment arm is substantially equal to the radius of the sphere. The prolate spheroidal shape of FIG. 1, however, allows the moment arm to be nearly twice that of a sphere of the same diameter with a corresponding doubling of the instrument sensitivity. In other words, the spheroidal shape of FIG. 1 distributes the structural weight of the sensing device where it can have the greatest effect on the horizontal flexure unit H. Thus, the torque inertia relation is maximized and provides for the greatest acceleration or response of the unit according to the well-known relation: viz., torque=moment of inertia×angular acceleration.

It will be apparent that the action of the aerodynamic sensing structure on the horizontal flexure section H is transmitted through the snug fit connection described above and tends to produce a rotation of the sensing structure about the flexure section. In order to balance the instrument and prevent it from acting as a compound pendulum, the center of gravity of the device should be located in the horizontal plane of the flexure section H, and particularly at the point where the axis of the mast M intersects said plane. Accordingly, counterweight means are provided in the mast M above the horizontal flexure unit, and the weight of such means is adjusted to offset the weight of the main portion of the sensing structure below the plane of the flexure unit H and place the center of gravity of the entire apparatus in said plane. The counterweight means may be of any suitable construction. In the form shown in FIGS. 1 and 2, the counterweight is combined with a damping means, to be described and explained more fully hereinafter, and comprises a base 21, an outer cylindrical shell 22 of soft magnetic iron, and a pair of Alnico magnets 23 separated by a disc 24. The disc 24 may be made of copper or other suitable conductive and non-magnetic material and is maintained in the space between the magnets by any convenient support connected to the base or main supporting structure of the instrument independent of the horizontal flexure unit H. The construction and location of this weight are designed to place the center of gravity of the complete instrument at the axis of rotation. Thus, any unusual loads on the sensing structure, such as from wind gusts, still move about the shell structure in rotation only and do not produce a reactive load at the flexure unit H. This condition is known as "dynamic balance." It will be apparent also that the location of the center of gravity as described produces static balance, and that due to the symmetry of the instrument about the axis of the mast, dynamic balance actually is attained merely by promoting static balance. By providing static balance in the manner described, the instrument is rendered insensitive to its own position. This is an important feature of this invention. As a result, it is not necessary for the mast M to be perfectly vertical at all times, and any loads produced by wind gusts which bend the supporting mast will not cause the instrument to indicate a greater steady wind value than actually existed before the gust.

It is important to provide some means for damping the instrument since there is a tendency for the aerodynamic structure and mast to oscillate at its characteristic frequency when excited by a gust of wind or a ground tremor, for example, rather than follow the primary force vector of the main wind current. In the present construction the high drag produced in the shells of the sensing structure is responsible for some damping. Such "air damping" is proportional to the velocity of the surrounding air relative to the motion of the aerodynamic shell, so that the greater the gust the more significant the air damping will be. It has been found, however, that additional damping is desirable and this is provided in the magnets 22 and 23 and copper disc 24, referred to above. When a thin disc of some conductive nonmagntic material, such as the aluminum or copper disc 24, is caused to move at right angles to a magnetic field, a force is produced within the disc that opposes such movement in proportion to the velocity thereof. Such movement would be caused in this instance by a movement of the sensing structure and horizontal flexure unit when struck by a wind current. Eddy currents are generated within the granular structure of the thin plate 24 and these circulating eddy currents create a motor action that tends to resist the forced motion. Such resistance to motion is known as "eddy current damping" and is accomplished in the present construction by the combination of the magnets 22 and 23 and the disc 24.

Base 21, in the form shown, may be regarded as the main force transmitting member of the instrument. This base is provided on its underside with an annular groove 25 for the reception of a cylindrical flexure unit 26 which constitutes the horizontal flexure unit H. The construction of the cylindrical flexure unit 26, i.e., horizontal flexure unit H, is an important feature of this invention because it includes the means for measuring the two horizontal components of the wind. As best shown in the developed view of FIG. 6 (but also in FIGS. 1 and 2), the cylindrical flexure unit has a first pair of flexure beams 27 formed therein, 180° apart, by making two vertical cuts or slots 28, one on each side of a beam. The two sets of slots are interconnected at the lower ends thereof by curved circumferential cuts 30. In this way, the two beams 27 form a connection between the upper part of the flexure unit and the bottom, so that a force applied to the upper portion of the unit, such as might be produced by a north-south wind vector, will effect a bending of the beams. Any such bending of the beams may be measured by suitable strain gages 31 which may be attached to each side of either or both of the beams 27.

Similarly, in order to measure the east-west force vectors, for example, a second pair of beams 32 is formed in the cylindrical flexure unit by the provision of a vertical slot 33 on each side of a beam, said slots being interconnected at the upper ends thereof by curved circumferential cuts 34. Beams 32 are also 180° apart and positioned 90° from beams 27, so that any force vectors causing bending thereof may be measured by suitable strain gages 35 positioned on each side of one or both of said beams. The length and width of the beams 27 and 32 are determined primarily by the type of strain gages employed. The dimensions should be sufficient to provide a movement within the range of the gages and also a proper mounting place for the gages.

Hereinbefore the description has referred to the flexure plane. This plane is the one in which the center of gravity of the instrument is situated and constitutes a plane passing substantially through the midpoints of the beams 27 and 32 and their associated strain gages. It will be understood that the curvature of the circumferential slots 30 and 34 is such as to permit the beams 27 and 32 and their strain gages to be substantially in horizontal alignment.

As mentioned above, some air damping of the instrument takes place due to the aerodynamic drag of the shell structure, and the eddy current damping is also provided. In addition, it is also desirable to prevent excessive displacement during flexure of the beams 27 and 32 and this may be accomplished by the provision of a suitable nonlinear restoring force within the horizontal flexure unit. In FIG. 5, and also partially in FIG. 2, it will be noted that a first pair of nonlinear springs in the form of cantilever beams 36 is attached to an axial supporting stud 37 which extends along the vertical axis of the instrument and is attached to an adapter or base beneath the flexure unit. The cantilever beams project from this stud into the cuts 34, in contact with the upper edges thereof, and are shaped to change in cross-sectional area along their length so as to be effective nonlinear springs and create a variable section modulus and a load-deflection characteristic which functions according to an inverse square law. A second pair of similar nonlinear springs or cantilever beams 38 is attached to the stud 37, and these extend into the cuts 30 in contact with the upper edges thereof. Each flat spring cantilever beam 36 and 38 also may have a rolling action against a specially shaped surface 40, which, in conjunction with the variable section, controls the load-deflection rate precisely. The special surfaces 40, in this instance, are formed on upper and lower sides of a spacer member mounted on stud 37 between the two sets of beams 36 and 38. If desired, the strain gages associated with the flexure beams 27 and 32 may be mounted on the beams 36 and 38, so that the strain per unit of angular deflection will be nonlinear.

To transmit the force vectors present in wind striking the aerodynamic sensing structure S to the mast M, and particularly the horizontal flexure unit just described, a cylindrical casing 41 is attached at the upper end thereof to the outer edge 42 of the combination base and force transmitting member 21. This casing may be made of any suitable material, for example, fabric reinforced phenolic, or transparent methyl methacrylate, or acrylic plastic, and is spaced from the cylindrical flexure unit 26 sufficiently to prevent contact therewith during any movement thereof due to wind striking the aerodynamic sensing structure. As mentioned above, the cylindrical opening 15 in the inner shell of the sensing structure is sized to provide a snug fit between the inner shell 11 and the casing 41, and the outer edge 42 acts as a shoulder at the upper end of said casing for cooperative contact with the annular supporting rim 16.

Vertical force vectors or components of the wind are transmitted from the aerodynamic sensing structure S into the mast in the same manner as the horizontal components. Such vertical components travel down the mast through the horizontal flexure unit 26 and through an adapter 43 (FIG. 2) to the vertical flexure section V. The adapter 43 includes an upper reduced portion 44 which fits snugly into the inside of the cylindrical flexure section 26 immediately above it, and a lower portion 45 of proper diameter and length to provide a relatively rigid fit with the vertical flexure section V below it.

As best shown in FIGS. 3 and 4, vertical flexure section V comprises an inner movable force transmitting cylinder 46 and an outer stationary supporting cylinder 47, said inner cylinder being connected to the lower portion 45 of the adapter 43. Both cylinders are similar in construction and they are resiliently interconnected by a plurality of special flexure members 48. Outer supporting cylinder 47 is mounted on a primary support or base 50 (FIG. 2) for the entire instrument and connected thereto by a suitable attaching bracket 51. Each of the cylinders 46 and 47 is carefully constructed and may include an upper closure ring 52, an upper cylindrical section 53, and a first set of supporting rings 54. Below these rings an intermediate cylindrical section 55 provides a separator for a second set of supporting rings 56, and a lower cylindrical section 57. A bottom closure ring may be provided to separate this second set of the outer cylinder from the adapter 51, if desired. All of these parts may be constructed of any suitable rigid material, the rings in the present instance being made of aluminum and the three cylindrical sections being made of a transparent plastic, such as those known as Lucite or Plexiglas. The parts of outer cylinder 47 are held or clamped in their FIG. 1 and FIG. 2 positions by a plurality of elongated machine bolts or tie rods 60 which pass through suitable openings provided in each of the rings and cylindrical sections, there being three such tie rods 60, in this instance, spaced approximately 120° apart. The inner force transmitting cylinder 46 includes a series of sections and rings identical in number and substantially the same axial length as those of the outer cylinder. These are similarly held together by a plurality of elongated tie rods 61.

While it is possible to construct the cylinders 46 and 47 as single unitary structures, there are advantages in the multiple ring and plastic sections, primarily from the point of view of assembly and installation of the special flexure members 48. There are six such flexure members in the present construction and they are arranged in two sets of three spaced 120° apart in each set. As mentioned above, the flexure members 48 provide a resilient support or connection between the inner, movable, force-transmitting cylinder 46 and the outer cylinder 47. As best shown in FIGS. 3 and 4, the uppermost flexure member 48 is clamped between the top two rings 54 in the upper set of rings of the inner cylinder 46, extends across the inner cylindrical space through an opening 62 provided in the wall of the inner cylinder, and is clamped between the upper two rings of the outer cylinder 47. Thin slots or indentations, corresponding to the size and approximate thickness of the flexure members 48, may be provided in the clamping rings, if desired. A second flexure member 48 is spaced 120° from the first such member and similarly clamped between the second and third rings of the inner cylinder, so that it may extend across the inner cylindrical space, through an opening 62 in said inner cylinder wall for clamping between the second and third rings of the outer cylinder. Next a third resilient member 48 is spaced 120° from the second member and similarly clamped between the third and fourth rings.

It is desired to have the flexure members 48 under simulated dead weight loading as they are clamped between the rings of the inner and outer cylinders. Thus, each flexure member, which may be formed of a suitable resilient metal or alloy such as beryllium copper or spring steel, is slightly bowed or so shaped during a heat treatment that this initial load or weight of the instrument just brings the leaf again to a flat and horizontal state. In addition, each flexure member preferably has an S-shaped convolution 63 bent or otherwise formed therein. The purpose of the convolution is to act as a means of relieving the loads, i.e., direct stresses, that would otherwise develop along the axis of each spring member when deflected from an initial position of equilibrium. As shown in FIG. 3, each convolution is preferably positioned approximately at the midspan of the leaf flexure where the imposed bending moment is zero. At other points the differential moment across the convolute gives this member a nonlinear characteristic in its own longitudinal direction. This method of flexibly interconnecting the inner and outer cylinders will permit only axial movement between them, as the system of resilient members must offer considerable restraint to all other types of applied forces such as bending moments, shear, and torsion. The size of the openings 62 in the inner cylinder is made sufficiently large for such axial movement to take place without contact between a resilient member and the edges of the opening.

To provide the desired combination of resiliency and firmness in the support between the inner and outer cylinders, it is desirable to have a second set of resilient members 48 mounted between the individual rings 56 of the lower set shown in FIG. 3. Such members are clamped and spaced the same as those described above for the upper set of rings. They are also provided with convolutions 63, but as shown in FIG. 3, such convolutions are positioned upside down with respect to the convolutions in the first set of resilient members. In this way, any remaining nonlinear influence of the convolutions upon the deflection of each spring-like member is made self-cancelling.

In operation, when a wind current contacts the sensing structure S, the various components of force resolved therefrom will be transmitted from the inner shell of the sensing structure to the mast M, due to the mounting of the inner shell on said mast through the snug contact of the cylindrical opening 17 with the casing 41 and force transmitting member 21. It has been stated above that such vertical force vectors travel through the horizontal flexure unit 26 and the adapter 43 to the vertical flexure unit V where they act upon the inner cylindrical force receiving cylinder 46. It will be apparent that any such vertical force vector exerting its effect upon the cylinder 46 will cause a flexing of the flexure members 48. In order to measure such vertical force vectors, suitable strain gages 64 may be mounted on the upper and lower surfaces of one or more of said flexure members 48 adjacent to the convolutions 63. In the present instance, one set of strain gages 64 is shown mounted on the upper and lower surfaces of the lowermost flexure member 48 (FIG. 3). It is to be understood that, instead of using strain gages, vertical movement of the cylinder 46 may also be perceived and measured by a conventional differential transformer, or by any other suitable displacement sensing device, or cantilever springs like the springs 36 (FIG. 5) and associated strain gages could be used to measure the strain produced by vertical movement of the cylinder 46.

A particular feature of this invention is the location of the vertical flexure section so that the center of pressure passes substantially in the zone or region of the cylindrical section 55 between the two 120° flexure planes. In this manner a minimum of extraneous bending moments are imposed upon the section, as no moments exist in the plane of the center of pressure or shear load.

Various methods are available for converting the information obtained by the strain gages into electrical data or other information desired from the force vector transducer T; for example, each pair of strain gages may be connected to suitable circuitry and a meter which would read wind velocity in miles per hour. Thus, the gages 31 might read a first horizontal component, and the gages 35 a second horizontal component at right angles to the first, or these two could be combined to give a reading of direction and velocity. In the same manner the strain gages 64 may be connected with suitable circuitry and a meter which would give the force, in miles per hour, if desired, of any vertical component.

Strain gages are now well known and used widely in many different and interesting applications. In all instances the electrical resistance strain gage manifests a change in resistance proportional to strain, and forms part of an electrical circuit such that a current is passed through the gage and the resistance change may be transformed into current, voltage, or power change, which is subsequently measured. There are many types of strain gages now available. The semiconductor gage has been found most suitable for the practice of the present invention since the high sensitivity of such gages permits the beams 27 and 32 to be relatively thick so as to provide a high resonant frequency.

In FIG. 8, there is shown a wiring diagram of a typical Wheatstone bridge circuit 65 in which two strain gages, which may be any of the pairs referred to above, such as the pair of strain gages 64 on the top and bottom of the lowermost flexure member 48, are inserted as two of the resistances in arms of the Wheatstone bridge. A pair of leads 66 may then connect the bridge to an amplifier 67 and associated circuitry including, for example, suitable signal conditioning circuitry, a calibration switch 68, balance adjustment 70, and battery 71. The output signal from such an amplifier may then be read directly from a meter or passed on to other circuitry or read-out devices (not shown) for conversion or further action. As mentioned above, the strain gages and the circuitry and read-out devices associated therwith may be calibrated to give readings in any terms desired, such as miles per hour for the force of the wind.

When the instrument is not being used or is being moved from one location to another, it is desirable to inactivate or cage both the horizontal and vertical flexure units. It is also desirable to seal the outer casings of said flexure units so as to protect some of the more sensitive parts of the instrument from the elements. One form of construction for accomplishing such sealing and caging is shown in FIG. 2. Effective sealing is provided at the lower end of the instrument by a plurality of O-rings or other suitable sealing gaskets 74 arranged in the space between the outer cylinder 47 of the vertical flexure unit V and a protective cylindrical casing 75 which may be made of light-gauge aluminum or any other suitable material. The upper portion of the instrument may be sealed by a resilient bellows-diaphragm 76 attached between the casing 41 and the upper end or an extension of the protective casing 75.

Any caging or inactivating mechanism should be easily accessible from the outside of the instrument. Accordingly a larger annular collar 77, having a properly knurled outer surface, is mounted for turning or rotative movement around the lower cylindrical base 50 of the mast M outside the sensing structure S. An inwardly directed annular flange 78 formed on the lower edge of the collar 77 extends into a corresponding groove 80 provided in the base 50 and thus allows the collar to rotate but remain in proper axial position on said base 50. Collar 77 may be threaded at 81 to the protective cylindrical casing 75 and thus supports said casing on the base 50. The threads 81 are constructed to effect a vertical movement of the casing 75 when the collar is turned and cause a corresponding vertical movement of a cam surface 82 provided on the upper end of the said casing. Cam 82 is arranged to cause an inward movement of a spring detent 83 provided on the outer cylinder 47. Such movement locks the detent in a groove 84 formed in the upper end of the inner cylinder 46. This effectively cages the vertical flexure unit V by locking the cylinders 46 and 47 against relative movement.

Horizontal flexure unit H may also be inactivated by the same upward movement of the casing 75. For this purpose a locking wedge 85 may be formed on the upper end of casing 75, or an extension thereof, and is adapted to engage a correspondingly shaped surface 86 formed on the lower portion of the casing 41. It will be apparent, therefore, that by turning the knurled collar 77, the protective casing 75 may be moved up and down. An upward movement causes spring detent 83 to engage groove 84 and wedge 85 to engage surface 86 to lock or inactivate both the horizontal and vertical flexure units. A downward movement of the protective casing releases the wedge 85 and spring detent 83 to render the flexure units operative and ready for a wind measurement.

In view of the fact that the internal parts of the unit are closed and sealed as described above, it may be considered desirable to heat and dry the inner space for certain times and conditions of operation. This may be done in any conventional manner, such as by the provision of a heating element 87 and a silica gel drying capsule 88 in the base of the instrument.

We claim:

1. A force vector transducer for measuring fluid currents, comprising: means providing a partially spherical surface for engagement by a flowing fluid; means on said surface-providing-means for inducing turbulence in such flowing fluid to increase the drag coefficient for sensing a plurality of force vectors in a fluid current striking said surface; flexure means operatively connected to said spherical surface and adapted to be deflected in response to the action of said force vectors against said surface; and means for measuring such deflection of said flexure means.

2. A force vector transducer for measuring fluid currents, comprising: a force sensing structure including an outer pervious shell for creating maximum turbulence in a fluid stream striking said shell and including a plurality of force vectors, and an inner shell attached thereto for receiving force vectors from said pervious shell; flexure means operatively connected to said inner shell and adapted to bend in response to the action of at least one of said force vectors against said outer shell; and means for measuring such bending of said flexure means.

3. A force vector transducer for measuring wind currents, comprising: a force sensing structure including an outer shell having a multiplicity of openings therein to create a pervious surface which will produce maximum aerodynamic drag, and a lightweight inner shell attached to said outer shell and having an opening therein; supporting means removably mounted in the opening in said inner shell; a flexure member operatively mounted in said supporting means to be acted upon and deflected by one force vector of a wind current striking said force sensing structure; and means for measuring such deflection of said flexure member.

4. A force vector transducer for measuring wind currents, comprising: a force sensing structure including an outer shell having a multiplicity of openings therein to create a pervious surface which will produce a maximum and constant aerodynamic drag coefficient, and a lightweight inner shell attached to said outer shell and having an opening therein, each of said shells being partially spherical in shape; supporting means removably mounted in the opening in said inner shell; a flexure member operatively mounted in said supporting means to be acted upon and bent by one force vector of a wind current striking said force sensing structure; and means for measuring such bending of said flexure member.

5. A force vector transducer for measuring wind currents, comprising: a force sensing structure including an outer shell having a multiplicity of openings therein to create a pervious surface which will produce a maximum and constant aerodynamic drag coefficient, and a lightweight inner shell attached to said outer shell and having an opening therein, each of said shells being in the shape of a prolate spheroid; supporting means removably mounted in the opening in said inner shell; a flexure member operatively mounted in said supporting means to be acted upon and deflected by one force vector of a wind current striking said force sensing structure; means for measuring such deflection of said flexure member; and means for enclosing said supporting means and inactivating said flexure member.

6. In a force vector transducer of the type having a force sensing means which is adapted to respond to an angularly directed force striking said sensing means and including a plurality of force vectors: a flexure means operatively connected to said force sensing means so as to be acted upon by at least one of said force vectors and thereby cause a bending of said flexure means, said flexure means comprising a hollow cylindrical member operatively connected to said force sensing means and having two pairs of axially extending independently flexible bending beams arranged 90° apart formed by cutting in the wall of said cylindrical member.

7. A force vector transducer for measuring fluid currents, comprising: a partially spherical sensing structure for responding to a fluid current having both horizontal and vertical force vectors; means supporting said sensing structure with an axis thereof in a substantially vertical position; first flexure means mounted in said supporting means for deflection independently of other deflections by a horizontal force vector; a second flexure means mounted in said supporting means for deflection independently of other deflections by a vertical force vector; and means for inactivating said first and second flexure means.

8. A force vector transducer for measuring fluid currents, comprising: a partially spherical sensing structure for responding to a fluid current having both horizontal and vertical force vectors; means supporting said sensing structure with an axis thereof in a substantially vertical position; first flexure means mounted in said supporting means for deflection independently of other deflections by a horizontal force vector; a second flexure means mounted in said supporting means for deflection independently of other deflections by a vertical force vector; and counterweight means operatively connected to said supporting means and arranged to place the center of gravity of the transducer in the zone of said first flexure means.

9. A force vector transducer for measuring fluid currents, comprising: a partially spherical sensing structure for responding to a fluid current having both horizontal and vertical force vectors; means supporting said sensing structure with an axis thereof in a vertical position; first flexure means mounted in said supporting means and adapted to be deflected independently of other deflections by a horizontal force vector; a second flexure means mounted in said supporting means and adapted to be deflected independently of other deflections by a vertical force vector; and eddy current damping means operatively connected to said supporting means for preventing any vibrations in said sensing structure from affecting at least said first flexure means.

10. A unit for force vector measuring means, comprising: a hollow tubular member having a plurality of substantially longitudinally and circumferentially extending slots cut in the wall thereof to form opposite end sections and two pairs of axially extending independently flexible beams arranged substantially 90° apart, each pair of beams being directly connected at one to an end section and having the opposite end of such pair indirectly connected to the other end section through the other pair of beams by substantially circumferentially and longitudinally extending connecting portions of the tubular member, the beams being relatively thin a direction circumferentially of said tubular member compared to said longitudinally extending connecting portions of said tubular member.

11. A unit for force vector measuring means, comprising: a hollow tubular member having a plurality of substantially longitudinally and circumferentially extending slots cut in the wall thereof to form opposite end sections and two pairs of axially extending independently flexible beams arranged substantially 90° apart, each pair of beams being directly connected at one end to an end section and having the opposite end of such pair indirectly connected to the other end section through the other pair of beams by substantially circumferentially and longitudinally extending connecting portions of the tubular member, the beams being relatively thin a direction circumferentially of said tubular member compared to said longitudinally extending connecting portions of said tubular member; and strain gage means secured to surfaces of said flexible beams exposed by the slot cutting operations to detect the bending of such beams.

12. A flexure unit for measuring force vectors, comprising: inner and outer tubular substantially axially aligned members; a plurality of flexure elements interconnecting said inner and outer members, said flexure elements being attached at one end to the outer member, extended diametrically across said members and attached at the opposite end to the inner member, said flexure elements being angularly spaced around the axes of said members and provided with stress relieving means at regions symmetrical about the axes of said member; and means for measuring any bending of said flexure members.

13. An aerodynamic structure for sensing the force vectors in a wind current, comprising: an outer partially spherical shell having a central axis and multiplicity of apertures in the surface of said shell; and an inner similarly shaped shell connected to the inside of said outer shell in axial alignment therewith, and force sensing means engaged with said inner shell.

14. An aerodynamic structure for sensing the force vectors in a wind current, comprising: an outer thin shell having a multiplicity of apertures therein, said shell being shaped in the form of a prolate spheroid; and an inner similarly shaped shell connected at the upper end thereof to the inside of said outer shell, said inner shell having means associated therewith for the reception of a force measuring means.

15. An aerodynamic structure for sensing the force vectors in a wind current, comprising: an outer thin shell having a multiplicity of apertures therein, said shell being shaped in the form of a prolate spheroid; an inner shell connected at the upper end thereof to the inside of said outer shell; and force measuring means connected with said inner shell.

16. An aerodynamic structure for sensing the force vectors in a wind current, comprising: an outer thin shell having a multiplicity of apertures therein, said shell being shaped in the form of a prolate spheroid; an inner shell connected at the upper end thereof to the inside of said outer shell; supporting means operatively connected to said inner shell; and force measuring means mounted in said supporting means.

17. A flexure unit for measuring force vectors, comprising: inner and outer tubular substantially axially aligned members; a plurality of sets of flexure elements interconnecting said inner and outer members adjacent each of the ends thereof, the flexure elements of each set being attached at one end to the outer member, extended diametrically across said members and attached at the opposite end to the inner member, the flexure elements of each set being angularly spaced around the axes of said members and provided with stress relieving means at regions symmetrical about the axes of said members, the stress relieving means of one set being reversed from that of the other set; and means for measuring any bending of said flexure members.

18. A force vector transducer for measuring fluid currents, comprising: a support; flexure means mounted on said support, said flexure means having a tubular body with a plurality of openings formed in the wall thereof to provide independently flexible sets of axially extending beam elements spaced 90° apart around said body; fluid force receiving means secured on one end of said tubular body; and strain gage means mounted on said beam elements to measure the bending thereof.

19. A force vector transducer for measuring fluid currents, comprising: a support; flexure means mounted on said support, said flexure means having a tubular body with a plurality of openings formed in the wall thereof to provide axially extending beam elements spaced 90° apart around said body; means mounted on said support and engaging portions of said tubular body at opposite ends of said beam elements to control the load-deflection rate thereof precisely; fluid force receiving means secured on one end of said tubular body; and strain gage means mounted on said beam elements to measure the bending thereof.

20. A force vector transducer for measuring fluid currents, comprising: a support; flexure means mounted on said support, said flexure means having a tubular body with a plurality of openings formed in the wall thereof to provide axially extending beam elements spaced 90° apart around said body; means mounted on said support and engaging portions of said tubular body at opposite ends of said beam elements to control the load-deflection rate thereof precisely; fluid force receiving means secured on one end of said tubular body; means secured to said support and said tubular body for dynamically balancing the fluid force receiving means; and strain gage means mounted on said beam elements to measure the bending thereof.

21. A force vector transducer for measuring fluid currents, comprising: a support; flexure means mounted on said support, said flexure means having a tubular body with a plurality of openings formed in the wall thereof to provide axially extending beam elements spaced 90° apart around said body and extending substantially equidistantly on opposite sides of a plane normal to the axis of said body; fluid force receiving means secured on one end of said tubular body; means connected with said tubular body for locating the center of gravity of said fluid force receiving means and associated elements at the center of said plane; and straing gage means mounted on said beam elements to measure the bending thereof.

22. A force vector transducer for measuring fluid currents, comprising: a support; flexure means mounted on said support, said flexure means having a tubular body with a plurality of openings formed in the wall thereof to provide an end portion connected to the remaining portion by axially extending beam elements spaced 90° apart around said body and extending substantially equidistantly on opposite sides of a plane normal to the axis of said body; means mounted on said support and engaging said end and remaining portions of said tubular body to precisely control the load-deflection rate of said beam elements; cooperative means on said support and the end portion of said tubular body for resisting sudden relative lateral movements thereof; fluid force receiving means secured to the end portion of said tubular body; and strain gage means mounted on said beam elements to measure the bending thereof.

References Cited by the Examiner
UNITED STATES PATENTS

| 2,560,326 | 7/1951 | Barry | 73—382 |
| 2,688,456 | 9/1954 | Jensen | 73—430 X |
| 2,855,779 | 10/1958 | Zaid | 73—88.5 X |
| 2,918,816 | 12/1959 | Ormond | 73—147 |

FOREIGN PATENTS 1,052,708  3/1959  Germany.

RICHARD C. QUEISSER, Primary Examiner.

CHARLES A. CUTTING, Examiner.

UNITED STATES PATENT OFFICE
CERTIFICATE OF CORRECTION

Patent No. 3,217,536                 November 16, 1965

Richard N. Motsinger et al.

It is hereby certified that error appears in the above numbered patent requiring correction and that the said Letters Patent should read as corrected below.

Column 12, lines 22 and 36, after "thin", each occurrence, insert -- in --; line 51, for "member" read -- members --.

Signed and sealed this 10th day of January 1967.

(SEAL)
Attest:

ERNEST W. SWIDER                 EDWARD J. BRENNER
Attesting Officer                 Commissioner of Patents